US011585401B2

(12) United States Patent
Bergesio et al.

(10) Patent No.: US 11,585,401 B2
(45) Date of Patent: Feb. 21, 2023

(54) ANNULAR SEALING UNIT FOR GUIDING A MONO-TUBE SHOCK ABSORBER

(71) Applicant: Aktiebolaget SKF, Gothenburg (SE)

(72) Inventors: Davide Bergesio, Chieri (IT); Marco Bresso, Turin (IT); Luca Lupieri, Rivoli (IT)

(73) Assignee: AKTIEBOLAGET SKF

( * ) Notice: Subject to any disclaimer, the term of this patent is extended or adjusted under 35 U.S.C. 154(b) by 713 days.

(21) Appl. No.: 16/504,666

(22) Filed: Jul. 8, 2019

(65) Prior Publication Data

US 2020/0025273 A1    Jan. 23, 2020

(30) Foreign Application Priority Data

Jul. 23, 2018   (IT) .................. 102018000007447

(51) Int. Cl.
*F16F 9/36*    (2006.01)
*F16F 9/32*    (2006.01)

(52) U.S. Cl.
CPC ............. *F16F 9/3207* (2013.01); *F16F 9/36* (2013.01)

(58) Field of Classification Search
CPC ............. F16F 9/36; F16F 9/362; F16F 9/3207
See application file for complete search history.

(56) References Cited

U.S. PATENT DOCUMENTS

| 9,995,361 | B2* | 6/2018 | Takeuchi | ................... F16F 9/36 |
| 10,066,696 | B2* | 9/2018 | Takeuchi | ............... B60G 15/06 |
| 10,626,948 | B2* | 4/2020 | Takeuchi | ................ F16F 9/362 |
| 11,231,109 | B2* | 1/2022 | Oyama | ................ F16J 15/3216 |
| 2006/0103075 | A1 | 5/2006 | Zahn | |
| 2008/0309016 | A1* | 12/2008 | Ozawa | ...................... F16F 9/36 |
| | | | | 277/345 |

(Continued)

FOREIGN PATENT DOCUMENTS

| CN | 101324272 | 12/2008 |
| CN | 104214265 | 12/2014 |

(Continued)

OTHER PUBLICATIONS

International Search Report for Italy Application No. 102018000007447 dated Mar. 20, 2019.

(Continued)

*Primary Examiner* — Thomas W Irvin
(74) *Attorney, Agent, or Firm* — Reed Smith LLP

(57) ABSTRACT

A sealing unit for a stem of a mono-tube shock absorber includes a first seal having a sealing ring providing an annular sealing lip that projects in a radially and axially inner direction to slidingly cooperate with the stem and ensure a sealing action with respect to pressurized working fluid inside the mono-tube shock absorber; a second seal with a sealing ring having an annular sealing lip, which projects protruding in a radially and axially external direction to slidingly cooperate, with the stem and ensure a sealing action with respect to the outside of the mono-tube shock absorber; a reinforcing ring snapped into an annular seat of the sealing ring. The reinforcing ring is arranged axially locked between the lip and a bottom wall of the second sealing lip; the first and second seals are two physically distinct and separate elements assembled separately inside a body of the shock absorber.

9 Claims, 2 Drawing Sheets

(56) References Cited

U.S. PATENT DOCUMENTS

2017/0037922 A1* 2/2017 Takeuchi ................. F16F 9/19
2017/0074344 A1* 3/2017 Takeuchi ................ F16F 9/362
2017/0138432 A1* 5/2017 Takeuchi ............... B60G 15/06
2020/0080642 A1* 3/2020 Oyama ................... F16F 9/362
2021/0348668 A1* 11/2021 Nakagawa ............. F16F 9/363

FOREIGN PATENT DOCUMENTS

| | | |
|---|---|---|
| CN | 104919227 | 9/2015 |
| CN | 106838102 | 6/2017 |
| DE | 8201327 | 5/1982 |
| EP | 1074760 | 2/2001 |
| EP | 1729045 | 12/2006 |
| EP | 1939485 A1 | 7/2008 |
| EP | 2280198 B1 | 2/2011 |
| EP | 2541109 | 1/2013 |
| JP | 2005023966 | 1/2005 |
| JP | 2012202481 | 10/2012 |
| JP | 2013185666 | 9/2013 |
| JP | 2016118252 | 6/2016 |

OTHER PUBLICATIONS

Office Action for corresponding China Application No. 201910659729.2 dated Mar. 23, 2022.

* cited by examiner

ANNULAR SEALING UNIT FOR GUIDING A MONO-TUBE SHOCK ABSORBER

CROSS-REFERENCE TO RELATED APPLICATIONS

This application claims priority to Italian patent application no. 102018000007447 filed on Jul. 23, 2018, the contents of which are fully incorporated herein by reference.

FIELD OF THE INVENTION

The present invention relates to an annular sealing unit for a mono-tube shock absorber.

BACKGROUND OF THE INVENTION

Hydraulic shock absorbers of the mono-tube type, which are used exclusively in the motor-vehicle industry and other industries, are intended to work under relatively high hydraulic pressures, on average in the region of 20 bar, with peaks which may be as high as 100 bar or more. The mono-tube shock absorber has the advantage that it may be mounted not only in a vertical or sub-vertical position (as in the case of dual-tube shock absorbers) but also in sub-horizontal or even horizontal positions. For this reason, the mono-tube shock absorber is widely used in the motorcycling industry. Furthermore, it is widely used also in the motor vehicle industry since, for the same performance, it has a smaller size and weight than dual-tube shock absorbers.

As is known, the mono-tube shock absorber has a chamber into which gas under pressure is blown and the gas in turn pressurizes the hydraulic working fluid, normally oil, contained inside a second chamber. As already mentioned, the oil reaches pressure peaks in the region of 100 bar.

In view of these high working pressures, the sealing action with respect to the pressurized oil which is contained inside the shock absorber body and which opposes during use the reciprocating movement of the piston inside the body is provided by means of a sealing unit mounted on a bushing which is engaged by and passed through by a stem of the shock absorber, of the type described in the German utility model published under number DE8201327U.

This sealing unit according to the prior art has numerous parts which must be assembled separately and is therefore relatively bulky and complex to assemble and has a performance which tends to deteriorate with a lowering of the temperature. In particular, when the rubber ring described in DE8201327U, which forms the main sealing element, is made of a particular fluorinated synthetic elastomeric material, the sealing unit has a minimum working temperature which does not go below −15° C. when, instead, the current applications would require a minimum working temperature of −40° C.

European patent No. EP and European patent application No. EP-A-06425875 disclose sealing units for shock absorber stems and associated units for withstanding fatigue stresses and remaining in any case efficient for a relatively long period of time. However, the sealing unit described in European patent No. EP1074760B1 is not suitable for use on mono-tube shock absorbers and has, as does the sealing unit according to European patent application No. EP-A-06425875, axial dimensions which are smaller than those of DE8201327U, but are still relatively large if the overall size and weight of the shock absorber is to be reduced while maintaining the same working stroke. Moreover, the sliding-contact lips of the elastomeric part of the sealing unit have a performance over time which may be improved.

A sealing unit providing a more suitable solution for mono-tube shock absorbers is described in European patent No. EP1729045. This sealing unit is suitable for performing a static and dynamic sealing function with respect to the pressurized oil inside the shock absorber as well as a dynamic sealing function with respect to the external environment ("dust cover" seal), so that dust and other impurities are unable to penetrate inside the shock absorber.

This solution, whereby the oil seal and the dust cover seal are pre-assembled together, is not versatile. For example, it is not possible to perform pressurization of the oil by blowing in gas, during an intermediate stage of seal assembly, as is often required by end clients for specific production needs. There therefore exists a need to define an annular sealing unit for a mono-tube shock absorber which does not have the abovementioned drawbacks.

BRIEF SUMMARY OF THE INVENTION

The object of the present invention is to define a sealing unit for mono-tube shock absorbers, which does not have the drawbacks of the prior art and, in particular, is suitable for mounting on shock absorbers of the mono-tube type, which easily withstands operating temperatures which are very low and which, more generally, lie within a wide temperature range, for example between −40° C. and +200° C., which withstands pressure peaks of up to 100 bar, which has small dimensions, in particular in the axial direction, namely in the direction of reciprocating movement of the shock absorber stem, which is simple and low-cost to produce and assemble and which incorporates several functions, for example a sealing function for the pressurized oil and a sealing function for the external environment. Finally, the sealing unit according to the present invention must allow simpler and more versatile pressurization of the mono-tube shock absorber.

According to a first aspect of the present invention, therefore, a sealing unit for a mono-tube shock absorber is defined, according to the characteristic features indicated in the product claim 1.

According to another aspect of the present invention, a significant simplification in both constructional and assembly terms is obtained, resulting also in significant cost savings, but in particular an assembly method which facilitates the pressurization of the working fluid (namely oil) of the mono-tube shock absorber is obtained.

Further preferred and/or particularly advantageous embodiments of the invention are described in accordance with the characteristic features indicated in the attached dependent claims.

BRIEF DESCRIPTION OF THE SEVERAL VIEWS OF THE DRAWING

The invention will now be described with reference to the attached drawings which illustrate a non-limiting example of embodiment thereof, in which.

DETAILED DESCRIPTION OF THE INVENTION

Figure 1:
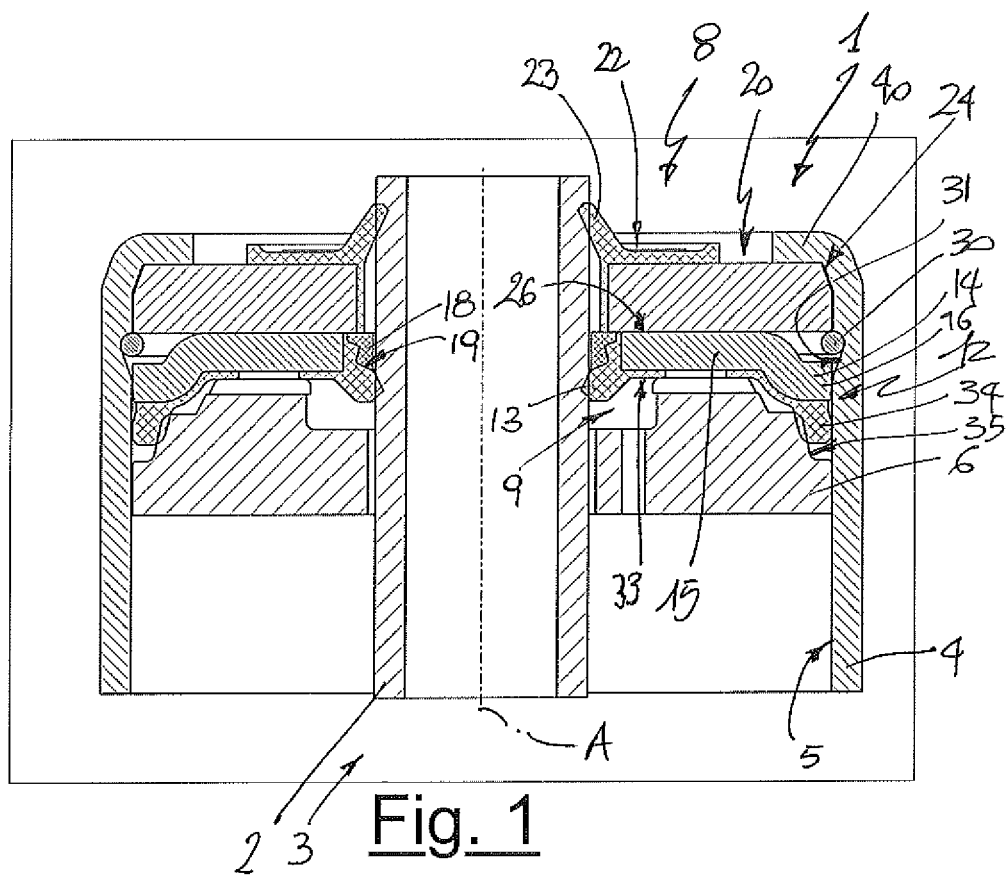
FIG. 1 is a diametrically sectioned view and schematically shows a sealing unit mounted on a mono-tube shock absorber according to an embodiment of the present invention.

With reference to FIG. 1, 1 denotes in its entirety a guiding and sealing unit for a stem 2 of a mono-tube shock absorber 3—shown only partly for simpler illustration and the rest of which is known—having a shock absorber body 4 which during use is full of oil and houses a moving piston (not shown) and which is bounded by an inner side wall 5. The unit 1 is mounted inserted in a fluid-tight manner against the wall 5 closing one end of the body 4 and has an axis of symmetry A coinciding with the axis of symmetry and axial sliding of the stem 2.

In the whole of the present description and the claims, the terms and expressions indicating positions and orientations such as "radial" and "axial" are understood as referring to the central axis of rotation A of the unit 1. Expressions such as "axially outer" and "axially inner" refer instead to the assembled condition and, in the specific case, preferably refer to an outer side of the shock absorber, i.e. a side in contact with the external environment, and, respectively, to an opposite side, i.e. side towards the inside of the shock absorber.

The unit 1, according to a known constructional arrangement, comprises:

a stem-guiding annular bushing 6 which is fixed, during use, in a fluid-tight manner to the inner side wall 5 of the body 4 of the shock absorber 3 and which, during use, is symmetrical with respect to the axis A and engaged by the stem 2 which passes through it; and a sealing unit 8, which is also symmetrical with respect to the axis A and inserted inside a cup-shaped seat 9 formed at an axially outer end of the bushing 6 facing during use the inside of the body 4 of the shock absorber 3.

The sealing unit 8, according to an aspect of the present invention, comprises a first seal 10 designed to ensure a sealing action with respect to the pressurized oil contained inside the shock absorber. The first seal 10 comprises a sealing ring 12 which is made of an elastomeric material and has an annular sealing lip 13 which projects protruding radially and axially inside the cup-shaped seat 9 so as to cooperate, during use, in a sliding manner, with the stem 2. The lip 13 therefore ensures a dynamic sealing action between the bushing 6 and the stem 2.

The first seal 10 further comprises a reinforced zone 14, for example made of metal, made using an elastically deformable material that is much more rigid than the elastomeric material of the sealing ring 12. The reinforced zone 14 has, viewed in radial cross-section, a flange portion 15 with cooperates against an axially external end 11 of the bushing 6. The flange portion 15 has an S-shaped profile such that its radially external end 16 projects in the axially inner direction. In this way the flange portion 15 leaves accessible a seat 31 present in the body 4 of the shock absorber 3, the function of which will be described below.

The sealing ring 12 has a flange portion 33 which extends in the radial direction so as to cover almost the entire end 11 of the bushing 6 and which is at least partly supported by the flange portion 15 of the reinforced zone 14, arranged between the flange portion 33 and the end 11; moreover, the flange portion 33 has an enlarged radially outer peripheral edge 34 which has a substantially toroidal shape in the undeformed condition and which engages an annular groove 35 formed on a radially outer edge of the end 10 and which, during use, cooperates by means of interference with the side wall 5 of the shock absorber body 4 so as to exert thereon a static hydraulic sealing action with respect to the oil contained inside the body 4. In particular the static seal is formed between the bushing 6 and the body 4 of the shock absorber.

According to one aspect of the invention, the sealing unit 8 further comprises a reinforcing ring 18 mounted by means of snap-engagement in an annular seat 19 of the sealing ring 12 formed on the opposite side to the projection direction towards the axis A of the lip 13 and in such a way that the reinforcing ring 18 is arranged axially locked between the lip 13 and a bottom wall of a second seal 20 which will be described further below. According to a preferred embodiment, the reinforcing ring 18 is pre-mounted in the first seal 10. The reinforcing ring 18 has a substantially L-shaped form viewed in radial cross-section.

The reinforcing ring 18 is, during use, engaged by the stem 2 which passes through it and, according to an aspect of the invention, is made of a material which has a low coefficient of friction, but is more rigid than the elastomeric material of the sealing ring 12. In this way, the reinforcing ring 18 is able to absorb the thrust exerted by the pressurized oil on the lip 13, preventing the latter from being deformed excessively resulting in an impaired functionality or at least reduced-performance functionality, it being clear that a greater deformation of the lip 13 results in a greater friction resistance to the movement of the stem 2.

According to another aspect of the invention, which is undoubtedly essential, the sealing unit 8 further comprises a retention ring 30 which has a more or less circular radial cross-section and is housed inside a suitable seat 31 formed in the side wall 5 of the body 4 of the shock absorber 3, in an axially external position with respect to the first seal 10. As will be remembered, this seat 31 is left accessible by the particular shape of the reinforced zone 14 of the first seal 10.

The retention ring 30 could be a Seeger type ring. Its function is that of locking in position the first seal 10, in particular during the procedure for assembling the sealing unit 8 which will be described below.

Finally, according to a further other aspect of the invention, the sealing unit 8 comprises a second seal 20 designed to ensure a sealing action with respect to the environment outside the mono-tube shock absorber and therefore able to prevent the entry of dust inside the body 4 of the shock absorber 3. The second seal 20 assumes a position axially on the outside of the retention ring 30.

In order to understand better the advantages of the present invention, it should be emphasized in particular that the first and second seals 10, 20 are two parts which are physically distinct and separate from each other such that they may be mounted separately and at different times inside the body 4.

The second seal 20 comprises a sealing ring 22 which is made of an elastomeric material and has an annular sealing lip 13 which projects protruding in a radially and axially outer direction so as to cooperate, during use, in a sliding manner, with the stem 2 and perform its "dust-cover" function.

The second seal 20 further comprises a reinforced zone 24, for example made of metal, made using an elastically deformable material which is much more rigid than the elastomeric material of the sealing ring 22. The reinforced zone 24 has, viewed in radial cross-section, a flange-like form 25 with cooperates against an axially external end 26 of the reinforcing ring 18.

The body 4 of the shock absorber 3 defines at its axially outer end a rolled edge 40 which is configured to pre-load axially the entire sealing unit 8.

In this way the transmission of the thrust imparted by the pressurized oil inside the shock absorber may be easily understood. The pressurized oil will essentially exert its thrust on the lip 13 of the first seal 10. The lip 13, as we have seen, is axially locked by the reinforcing ring 18 which, being more rigid than the lip 13, is able to absorb most of this thrust. In this way, as already mentioned, the degree of deformation of the lip 13 is reduced.

In turn, the reinforcing ring 18, axially locked by the flange portion 25 of the reinforced zone 24 of the second seal 20, will transmit the thrust of the oil to the second seal 20 (in particular to its metal reinforced zone 24) which in turn will transmit the thrust to the rolled edge 40 of the body 4 of the mono-tube shock absorber 3.

According to an essential aspect of the present invention, its configuration, as described hitherto, reduces significantly the complexity of the procedure for assembly of the sealing unit inside the shock absorber, the assembly being extremely simple. The sealing unit according to the invention it is possible to carry out, in an extremely simple and effective manner and without problems for the sealing unit, the procedure of blowing in gas for pressurization of the shock absorber 3.

Figure 2:
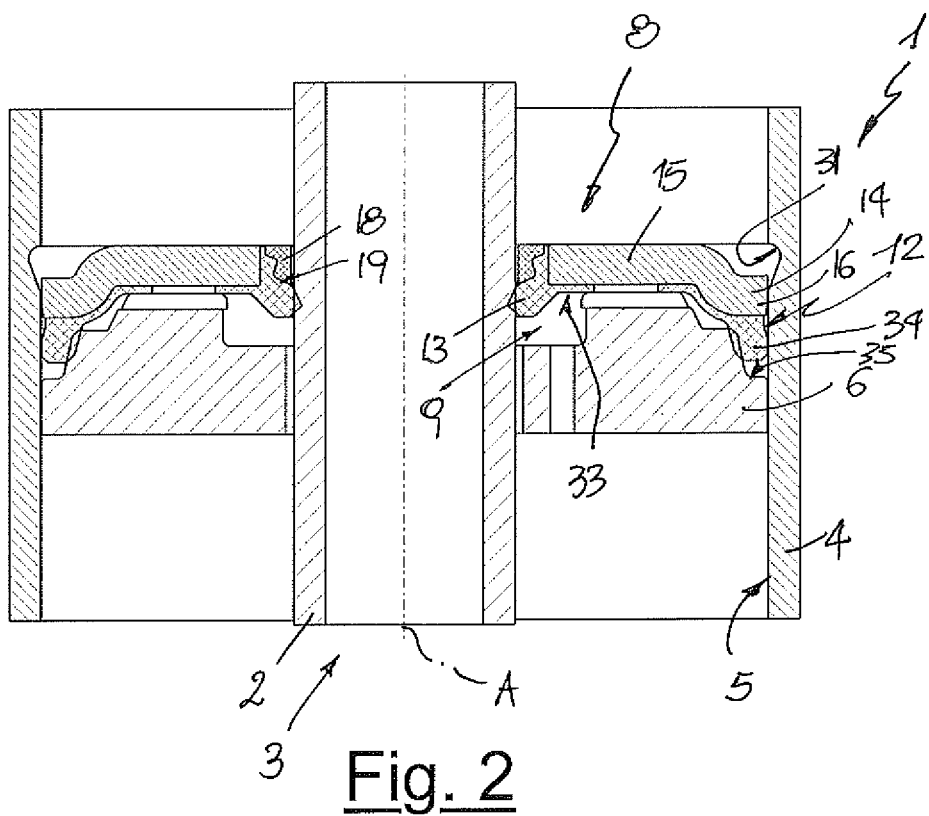
FIG. 2 is a diametrically sectioned view and schematically illustrates a first step during assembly of the sealing unit according to FIG. 1.
Figure 3:
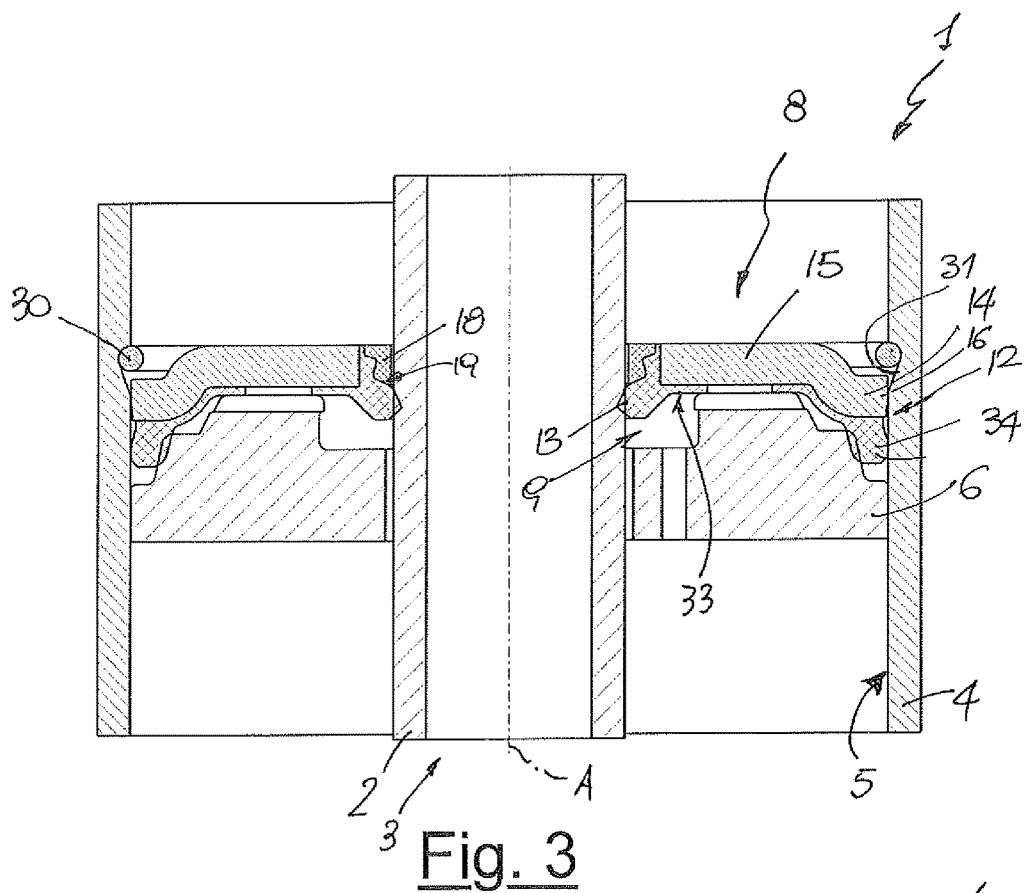
FIG. 3 is a diametrically sectioned view and schematically illustrates a second step during assembly of the sealing unit according to FIG. 1.
Figure 4:
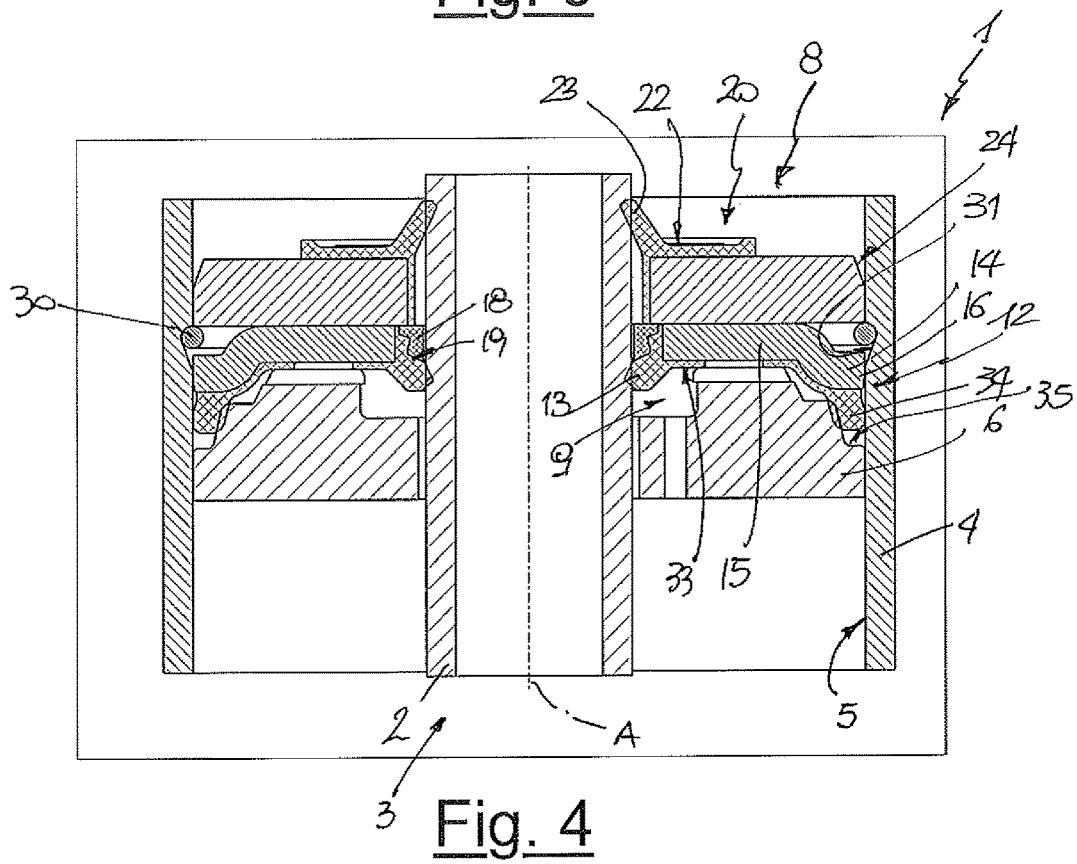
FIG. 4 is a diametrically sectioned view and schematically illustrates a further step during assembly of the sealing unit according to FIG. 1.

In fact and with reference to FIGS. 2 to 4 which show intermediate steps during assembly of the sealing unit 8, the steps of the method for assembly of the sealing unit may be performed in sequence.

FIG. 2 shows in schematic form a first step during assembly of the sealing unit 8 for the stem 2 of the mono-tube shock absorber 3, which in this case is shown only partly for simpler illustration. As can be seen in the aforementioned figure, in the shock absorber 3, already provided with the bushing 6, the first assembly step consists in the forced insertion of the first seal 10 inside the cup-shaped seat 9 of the bushing 6. As already mentioned, preferably the first seal 10 seats the reinforcing ring 18 which is pre-mounted by means of snap-engagement inside the first seal 10.

FIG. 3 shows in schematic form a second step during assembly of the sealing unit 8 for the stem 2 of the mono-tube shock absorber 3. As can be seen in the aforementioned figure, the second assembly step consists in fitting the retention ring 30, inside the special seat 31, formed in the side wall 5 of the body 4 of the shock absorber 3 and left accessible by the particular shape of the reinforced zone 14 of the first seal 10.

Since the function of the retention ring 30 is that of locking in position the first seal 10, in particular during the procedure for assembly of the sealing unit 8, pressurization of the shock absorber may be performed in a third assembly step immediately thereafter. Therefore, it is possible to perform blowing-in of the gas inside the shock absorber.

Thereafter, as shown in FIG. 4, fitting of the second seal 20 is performed, the reinforced zone 24 thereof cooperating against the axially external end 26 of the reinforcing ring 18.

Finally, the fifth and last assembly step (referring to FIG. 1 again) involves the rolling of the axially external edge 40 of the body 40 so that this rolled edge 40 pre-loads axially the entire sealing unit 8 and absorbs the thrust exerted by the pressurized oil.

The present invention, which is based therefore on the definition of a sealing unit for mono-tube shock absorbers in which:
- the seals, respectively, for the pressurized oil and the external environment are formed separately from each other; and
- a retention ring is arranged between them, is able to provide a product which is effective in qualitative terms, has small axial dimensions, is simple to assemble and in particular solves the problem of pressurization of the shock absorber, the operation being able to be performed, not at the end of the assembly of the sealing unit, but during an intermediate step of the procedure for assembly of the sealing unit.

In addition to the embodiments of the invention, as described above, it is to be understood that numerous further variants are possible. It must also be understood that the embodiments are only examples and do not limit the subject of the invention, nor its applications, nor its possible configurations. On the contrary, although the description provided above enables the person skilled in the art to implement the present invention at least in one of its examples of configuration, it must be understood that numerous variations of the components described are feasible, without thereby departing from the scope of the invention, as defined in the accompanying claims, interpreted literally and/or in accordance with their legal equivalents.

What is claimed is:

1. A sealing unit for a stem of a mono-tube shock absorber comprising:
   a first seal comprising:
      a first sealing ring having a first annular sealing lip, projecting in a radially and axially inner direction, configured to cooperate, in a sliding manner, with the stem of the mono-tube shock absorber and form a seal against a pressurized working fluid inside the mono-tube shock absorber; and
      a first reinforced zone comprising a first flange portion configured to cooperate against an axially external first end of a bushing, wherein a radially outer edge of the flange portion projects in an axially internal direction;
   a second seal comprising a second sealing ring having a second annular sealing lip projecting in a radially and axially external direction and configured to cooperate, in a sliding manner, with the stem of the mono-tube shock absorber and form a seal against an outside of the mono-tube shock absorber;
   a reinforcing ring mounted by snap-engagement in an annular seat of the first sealing ring, formed on a side opposite the projection direction towards an axis (A) of the first annular sealing lip, the reinforcing ring axially locked between the second annular sealing lip and a bottom wall of the second seal; and
   a retention ring comprising an almost circular radial cross-section housed in a seat formed on a side wall of a body of the mono-tube shock absorber, the retention ring configured to lock the first seal,
   wherein the first and second seals are two physically distinct and separate elements, mounted separately and at different times inside the body of the mono-tube shock absorber.

2. The sealing unit according to claim 1, wherein the flange portion has an "S" shaped profile.

3. The sealing unit according to claim 1, wherein the first sealing ring comprises a second flange portion extending radially and covering the first end of the bushing, wherein the second flange portion is partly supported by the first flange portion and arranged between the first flange portion and the first end of the bushing.

4. The sealing unit according to claim 3, wherein the second flange portion has a radially outer peripheral edge having a substantially toroidal shape in an undeformed condition configured to engage an annular groove formed on a radially outer edge of the first end and cooperate with the side wall of the shock absorber body by means of interference.

5. The sealing unit according to claim 1, wherein the reinforcing ring comprises a substantially L shaped radial cross-section and is configured to be pre-assembled in the first seal.

6. The sealing unit according to claim 1, wherein the reinforcing ring is made of a material having a low coefficient of friction and a rigidity greater than a rigidity of the elastomeric material of the sealing ring, and wherein the stem is configured to pass through and engage the reinforcing ring.

7. The sealing unit according to claim 1, wherein the second seal further comprises a second reinforced zone comprising a flange portion configured to cooperate against an axially external first end of the reinforcing ring.

8. A guiding and sealing unit for a stem of a mono-tube shock absorber comprising:
   an annular bushing configured to guide the stem and secured, in a fluid-tight manner, to an inner side wall of a body of the mono-tube shock absorber, wherein the bushing is symmetrical with respect to a central rotation axis (A) and is engaged by the stem passing through it; and
   a sealing unit comprising:
   a first seal comprising:
      a first sealing ring having a first annular sealing lip, projecting in a radially and axially inner direction, configured to cooperate, in a sliding manner, with the stem of the mono-tube shock absorber and form a seal against a pressurized working fluid inside the mono-tube shock absorber; and
      a first reinforced zone comprising a first flange portion configured to cooperate against an axially external first end of a bushing, wherein a radially outer edge of the flange portion projects in an axially internal direction;
   a second seal comprising a second sealing ring having a second annular sealing lip projecting in a radially and axially external direction and configured to cooperate, in a sliding manner, with the stem of the mono-tube shock absorber and form a seal against an outside of the mono-tube shock absorber;
   a reinforcing ring mounted by snap-engagement in an annular seat of the first sealing ring, formed on a side opposite the projection direction towards an axis (A) of the first annular sealing lip, the reinforcing ring axially locked between the second annular sealing lip and a bottom wall of the second seal; and
   a retention ring comprising an almost circular radial cross-section housed in a seat formed on a side wall of a body of the mono-tube shock absorber, the retention ring configured to lock the first seal,
   wherein the first and second seals are two physically distinct and separate elements, mounted separately and at different times inside the body of the mono-tube shock absorber.

9. A method for assembling a sealing unit for a stem of a mono-tube shock absorber inside which a bushing for guiding a stem of the shock absorber has been pre-assembled, the method comprising:
   inserting a first seal in a cup-shaped seat of the bushing, wherein a reinforcing ring is pre-mounted on the first seal by snap-engagement;
   fitting a retention ring in a seat formed on a side wall of a body of the shock absorber;
   inflating a gas inside the shock absorber configured to pressurize an internal working fluid;
   fitting a second seal provided with a reinforced zone configured to cooperate against an axially external first end of the reinforcing ring; and
   rolling an axially outer edge of the body of the shock absorber to axially preload the sealing unit and absorb a thrust exerted by the internal pressurized working fluid.

* * * * *